US011787425B2

United States Patent
Shinoda et al.

(10) Patent No.: US 11,787,425 B2
(45) Date of Patent: Oct. 17, 2023

(54) ELECTRONIC CONTROL DEVICE AND IN-VEHICLE DEVICE

(71) Applicant: Hitachi Astemo, Ltd., Hitachinaka (JP)

(72) Inventors: Hiroshi Shinoda, Tokyo (JP); Hideyuki Sakamoto, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 114 days.

(21) Appl. No.: 17/414,795

(22) PCT Filed: Nov. 20, 2019

(86) PCT No.: PCT/JP2019/045370
§ 371 (c)(1),
(2) Date: Jun. 16, 2021

(87) PCT Pub. No.: WO2020/129523
PCT Pub. Date: Jun. 25, 2020

(65) Prior Publication Data
US 2022/0017107 A1     Jan. 20, 2022

(30) Foreign Application Priority Data
Dec. 19, 2018 (JP) ................. 2018-237081

(51) Int. Cl.
*B60W 50/02* (2012.01)
*B60W 50/029* (2012.01)
(Continued)

(52) U.S. Cl.
CPC ...... *B60W 50/0205* (2013.01); *B60W 50/029* (2013.01); *B60W 50/035* (2013.01);
(Continued)

(58) Field of Classification Search
CPC .......... B60W 50/029; B60W 50/0205; B60W 60/00186; B60W 60/0015; B60W 50/035;
(Continued)

(56) References Cited

U.S. PATENT DOCUMENTS 9,195,232 B1 * 11/2015 Egnor .................. G05D 1/0055
2002/0093298 A1 * 7/2002 Walter .................... B60T 7/042
318/34
(Continued)

FOREIGN PATENT DOCUMENTS

JP     H05-53644 A     3/1993
JP     2015-532712 A    11/2015
(Continued)

OTHER PUBLICATIONS

International Search Report with English translation and Written Opinion issued in corresponding application No. PCT/JP2019/045370 dated Feb. 4, 2020.

*Primary Examiner* — Stephen Holwerda
(74) *Attorney, Agent, or Firm* — Foley & Lardner LLP

(57) ABSTRACT

An autonomous drive ECU 1 includes: at least two microcomputers 10 and 30 capable of receiving sensing data from a plurality of sensors 61; failure detection units 11 and 31 that detect a failure of the plurality of sensors 61 or the microcomputers 10 and 30; a mode selection unit 33 that selects a normal operation mode and a fallback operation mode; and a sensor selection unit that selects the sensor 61 based on a failure part detected by the failure detection unit 31 or a surrounding situation of an own vehicle calculated from the sensing data. Any of the at least two microcomputers 10 and 30 generates a drive signal for operating an actuator using the sensing data received from the sensor 61 selected by the sensor selection unit in the case of the fallback operation mode.

15 Claims, 5 Drawing Sheets

(51) Int. Cl.
*B60W 50/035* (2012.01)
*B60W 60/00* (2020.01)

(52) U.S. Cl.
CPC ... *B60W 60/0015* (2020.02); *B60W 2050/021* (2013.01); *B60W 2050/0215* (2013.01); *B60W 2050/0292* (2013.01); *B60W 2050/0297* (2013.01)

(58) Field of Classification Search
CPC ... B60W 2050/0215; B60W 2050/021; B60W 2050/0292; B60W 2050/0297
See application file for complete search history.

(56) References Cited

U.S. PATENT DOCUMENTS

| | | | |
|---|---|---|---|
| 2002/0099487 A1* | 7/2002 | Suganuma | B60R 16/0232 701/1 |
| 2004/0034810 A1 | 2/2004 | Heckmann | |
| 2007/0112483 A1* | 5/2007 | Jeong | B60W 10/26 701/22 |
| 2007/0213898 A1* | 9/2007 | Saito | B60G 17/0195 701/37 |
| 2015/0142244 A1* | 5/2015 | You | B60K 28/06 701/23 |
| 2015/0323668 A1 | 11/2015 | Heimberger | |
| 2017/0277607 A1* | 9/2017 | Samii | G06F 11/2033 |
| 2019/0041837 A1* | 2/2019 | Elenich | G07C 5/085 |
| 2020/0139982 A1 | 5/2020 | Sakamoto | |

FOREIGN PATENT DOCUMENTS

| | | |
|---|---|---|
| JP | 2016-196295 A | 11/2016 |
| JP | 2018-078682 A | 5/2018 |
| JP | 2018-144720 A | 9/2018 |
| JP | 2018-158591 A | 10/2018 |
| WO | WO-2018/220811 A1 | 12/2018 |
| WO | WO-2018/225352 A1 | 12/2018 |

* cited by examiner

ELECTRONIC CONTROL DEVICE AND IN-VEHICLE DEVICE

TECHNICAL FIELD

The present invention relates to an electronic control unit and a vehicle-mounted system.

BACKGROUND ART

An autonomous drive system is a system that can solve various social problems such as reduction in the number of accidents and elimination of traffic congestions, and efforts for practical use of the autonomous drive system have been active year by year worldwide. The high-level autonomous drive system is required to continue the operation until the driver takes over the operation or the own vehicle moves to a safe place to stop when a failure occurs in an autonomous drive electronic control unit (ECU), which is a higher-level control device that controls autonomous drive.

PTL 1 discloses a vehicle control device that secures high-reliability, real-time nature, and extensibility with a simple ECU configuration at a low cost by implementing backup upon an error with the whole system without increasing the redundancy of each controller more than necessary.

Specifically, PTL 1 discloses a fail-operational vehicle control system in which an actuator controller that operates an actuator that controls the vehicle includes control target value generation means for generating a control target value on the basis of a sensor value of a sensor controller when a failure occurs in the control target value generated by a higher-level controller, and controls the actuator through the control target value generated by the control target value generation means. Note that the sensor value here indicates a request signal from the driver such as a steering angle, a brake pedal position, and an accelerator pedal position.

CITATION LIST

Patent Literature

PTL 1: JP 2016-196295 A

SUMMARY OF INVENTION

Technical Problem

In order to continue the operation for a certain period of time when a failure occurs in the autonomous drive ECU, for example, multiplexing of the system and redundancy using operation monitoring are options. However, since the autonomous drive ECU uses a high-performance computer with a high calculation load, the cost increase due to redundancy cannot be avoided.

On the other hand, the vehicle control system disclosed in PTL 1 has a system configuration that avoids a cost increase due to simple system multiplexing. However, the purpose of this vehicle control system is vehicle control by sensing, and the vehicle control system does not include a sensor that recognizes the environment around the own vehicle necessary for the autonomous drive system. Therefore, even if the vehicle control system is applied to the autonomous drive system, it is impossible to take appropriate measures such as moving the own vehicle to a safe place when a failure occurs in the device itself.

The present invention has been made in view of the above points, and the object is to achieve a low-cost, highly-reliable advanced autonomous drive system that moves its own vehicle to a safe escape place even when a failure occurs in the autonomous drive ECU.

Solution to Problem

A brief outline of a representative one of the invention disclosed in the present application will be described as follows.

An electronic control unit according to a representative embodiment of the present invention includes: at least two microcomputers capable of receiving sensing data from a plurality of sensors; a failure detection unit that detects a failure of the plurality of sensors or the microcomputers; a mode selection unit that selects a normal operation mode and a fallback operation mode in accordance with a detection result by the failure detection unit; and a sensor selection unit that selects the sensor based on a failure part detected by the failure detection unit or a surrounding situation of an own vehicle calculated from the sensing data. Any of the at least two microcomputers generates, in the fallback operation mode, a drive signal for operating an actuator using the sensing data received from the sensor selected by the sensor selection unit, and transmits the drive signal to the actuator.

Advantageous Effects of Invention

Effects achieved by the typical invention disclosed in the present application will be briefly described as follows.

That is, according to the representative embodiment of the present invention, it is possible to achieve a low-cost, highly-reliable advanced autonomous drive system that moves its own vehicle to a safe escape place even when a failure occurs in the autonomous drive ECU.

DESCRIPTION OF EMBODIMENTS

Figure 1:
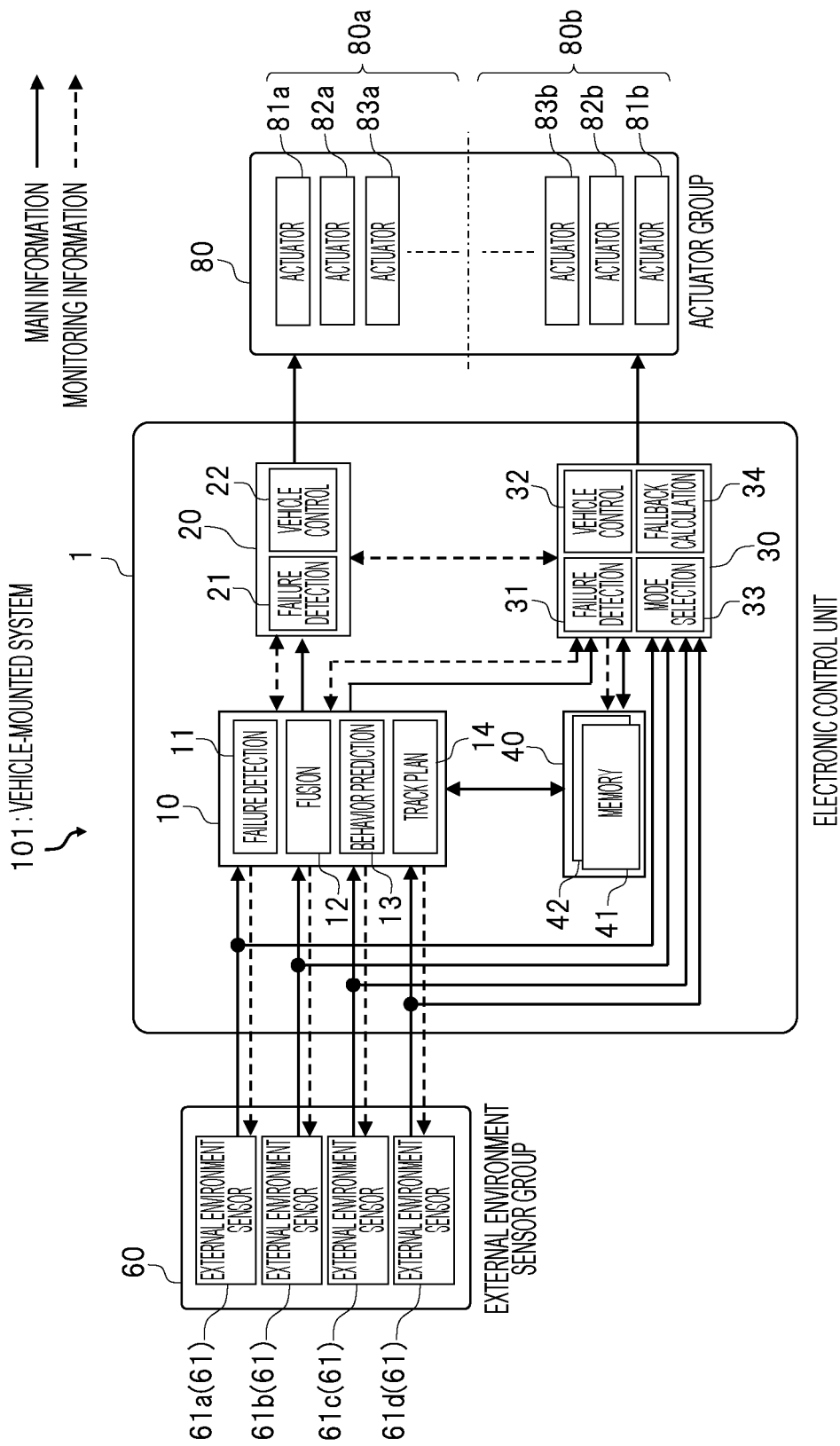
FIG. 1 is a block diagram illustrating an example of a configuration of a vehicle-mounted system according to a first embodiment of the present invention.

In the following embodiments, where necessary for the sake of convenience, the descriptions will be given separately regarding a plurality of sections or embodiments, but unless otherwise specified, they are not unrelated to each other, and one is in a relationship such as a modification, details, or supplementary explanation, and the like of some or all of the others.

In the following embodiments, where the number of elements and the like (including numbers, numerical values, quantities, ranges, and the like) are mentioned, the number of elements or the like is not limited to the specific number and may be equal to or greater than or equal to or less than the specific number, unless otherwise specified or except a case of being clearly limited in principle to the specific number. Furthermore, in the following embodiments, it is needless to say that the components (including element steps and the like) are not necessarily essential, unless otherwise specified or except a case of being considered to be obviously essential in principle. Similarly, in the following embodiments, where the shape, positional relationship, and the like of the components and the like are mentioned, the components and the like include those that are substantially approximate or similar to the shape and the like, unless otherwise specified or except a case of being considered obviously otherwise in principle. The same is true for the above numerical values and ranges.

Embodiments of the present invention will be described below in detail with reference to the drawings. Note that in all the drawings for explaining the embodiments, the same parts are given the same reference numerals in principle, and the repetition of the explanation will be omitted.

First Embodiment

<Configuration of Electronic Control Unit and Vehicle-Mounted System>

The autonomous drive ECU (electronic control unit) and the vehicle-mounted system according to the present embodiment switches the operation mode from the normal operation mode to the fallback operation mode, and moves the own vehicle to a safe escape place to stop, when a failure occurs.

FIG. 1 is a block diagram illustrating an example of the configuration of a vehicle-mounted system according to a first embodiment of the present invention. A vehicle-mounted system 101 includes an autonomous drive ECU 1, an external environment sensor group 60, and an actuator group 80.

In FIG. 1, data (e.g., sensing data, control signals, and drive signals) transmitted/received between blocks are indicated by a solid line as main information, and data (e.g., detection result) related to failure detection by a fusion MCU 10 and control MCUs 20 and 30 described later are indicated by a broken line as monitoring information. These main information and monitoring information are similar also in FIGS. 4 to 6 in the embodiment described later.

The external environment sensor group 60 includes a plurality of external environment sensors (sensors) 61 (e.g., 61a to 61d). Each of the external environment sensors 61 is a functional block that acquires the external situation of the own vehicle as sensing data and transmits the acquired sensing data to the autonomous drive ECU 1. The external environment sensor 61 includes, for example, a camera, a radar, and a laser radar. The external environment sensor 61 may include all of these or only some of them.

The detectable range of the external environment sensor 61 varies depending on each sensor, and is, for example, the front, the rear, the side of the own vehicle, a distance exceeding 200 m, an extreme vicinity of 10 m or less. The sensing data of the external environment sensor 61 includes positional information and the like of landmarks, other vehicles around the own vehicle, and obstacles such as pedestrians.

The actuator group 80 includes a plurality of actuators (81a to 83a, 81b to 83b, and the like in FIG. 1) that drive the own vehicle. The actuator is a mechanism that drives, for example, an engine, a brake, a power steering that controls a yaw rate.

The actuator group 80 of FIG. 1 includes, for example, two actuator groups. The actuators 81a to 83a and the like illustrated in the upper part of FIG. 1 constitute a first actuator group 80a, and the actuators 81b to 83b illustrated in the lower part of FIG. 1 constitute a second actuator group 80b.

The first actuator group 80a and the second actuator group 80b are a pair of actuator groups. For example, the actuators 81a and 81b are a pair of actuators having the same function. Similarly, the actuators 82a and 82b, the actuators 83a and 83b, and the like each are also a pair of actuators having the same function. Each actuator of the first actuator group 80a is controlled by the control MCU (second logic circuit unit) 20 of the autonomous drive ECU 1 described later, and each actuator of the second actuator group 80b is controlled by the control MCU (microcomputer, second logic circuit unit) 30 of the autonomous drive ECU 1 described later. Thus, in the vehicle-mounted system 1 of the present embodiment, the actuator of each function is duplicated.

<<Autonomous Drive ECU 1>>

The autonomous drive ECU 1 is a device that performs processing related to automatic drive of the own vehicle. As illustrated in FIG. 1, the autonomous drive ECU 1 includes the fusion MCU (microcomputer, first logic circuit unit) 10, the control MCUs 20 and 30, and a memory 40. The fusion MCU and the control MCUs 20 and 30 include a central processing unit (CPU) and a random access memory (RAM). Each functional block included in the fusion MCU 10 and the control MCUs 20 and 30 may be implemented only by hardware or software, or may be implemented by combining hardware and software. The configurations of the fusion MCU 10 and the control MCUs 20 and 30 will be described in detail later. The fusion MCU 10 and the control MCUs 20 and 30 are each provided with a communicator not illustrated, and data and the like are transmitted/received via the communicator. The communicator may be provided in each microcomputer or may be provided outside the microcomputer.

<<<Fusion MCU 10>>>

The fusion MCU 10 is a unit that performs main calculation related to autonomous drive. In the normal operation mode, autonomous drive of the own vehicle is performed based on the calculation result of the fusion MCU 10. The fusion MCU 10 performs calculation with a higher load than that of the other control MCUs 20 and 30 described later. For this reason, the fusion MCU 10 is equipped with a high-performance CPU having excellent processing capacity. As illustrated in FIG. 1, the fusion MCU 10 includes a failure detection unit (first failure detection unit) 11, a sensor fusion unit 12, a behavior prediction unit 13, and a track plan unit 14.

The sensor fusion unit 12 acquires sensing data of the plurality of external environment sensors 61, and extracts a surrounding situation (first surrounding situation) of the own vehicle based on the acquired sensing data. Specifically speaking, the sensor fusion unit 12 extracts obstacles such as other vehicles and pedestrians and positions of landmarks from the acquired sensing data. The sensor fusion unit 12 performs positioning of the landmark, the obstacle, and the own vehicle by collating the positions of the landmark and the obstacle with map information. At this time, the sensor fusion unit 12 may perform positioning of each obstacle and the own vehicle by calculating a relative position with reference to the landmark.

Then, the sensor fusion unit 12 plots the own vehicle and the obstacle on the map information based on the result of the positioning. Thus, the positions of the own vehicle and the obstacle in the map information are determined.

When the positions of the own vehicle and the obstacle are determined, the behavior prediction unit 13 predicts the behavior of the obstacle based on the surrounding situation of the own vehicle (e.g., the positional relationship of the own vehicle and the obstacle), and constructs a dynamic map (first dynamic map) including risk information associated with the behavior of the obstacle. The dynamic map includes risk information for a predetermined time (e.g., 10 seconds). The constructed dynamic map is stored in the memory 40.

During the autonomous drive, the behavior prediction unit 13 updates the dynamic map and stores the latest dynamic map in the memory 40. At this time, the memory 40 may store a plurality of dynamic maps including the latest dynamic map.

The track plan unit 14 creates a drive plan (first drive plan) based on the dynamic map and a preset destination of the own vehicle. The track plan unit 14 transmits the generated drive plan to the control MCUs 20 and 30. The destination of the own vehicle is set in a higher-level device such as a car navigation device, for example, and transmitted from the higher-level device to the autonomous drive ECU 1.

The failure detection unit 11 detects the state of each external environment sensor 61 (e.g., 61*a* to 61*d*) included in the external environment sensor group 60, and diagnoses the presence/absence of a failure. The failure detection unit 11 detects the states of the control MCUs 20 and 30, and diagnoses the presence/absence of a failure. The failure detection unit 11 may perform failure diagnosis by using a watchdog timer or may perform failure diagnosis by determining the sensing data. When detecting a failure in the external environment sensor 61 and the control MCUs 20 and 30, the failure detection unit 11 transmits a failure detection signal to the control MCU 30 as a detection result. At this time, information specifying the failure part may be transmitted to the control MCU 30 together with the failure detection signal.

The fusion MCU 10 may cause the control MCUs 20 and 30 to perform light-load calculation processing among calculation processing executed in each functional block. This reduces the load on the fusion MCU 10.

<<<Control MCU 20>>>

The control MCU 20 and the control MCU 30 described later are functional blocks that drive each actuator included in the actuator group 80. As illustrated in FIG. 1, the control MCU 20 includes a failure detection unit (second failure detection unit) 21 and a vehicle control unit 22.

The failure detection unit 21 detects the states of the fusion MCU 10 and the control MCU (another second logic circuit unit) 30, and diagnoses the presence/absence of a failure. When detecting the failure of the fusion MCUs 10 and 30, the failure detection unit 21 transmits a failure detection signal to the control MCU 30. At this time, information specifying the failure part may be transmitted to the control MCU 30 together with the failure detection signal.

In the normal operation mode, the vehicle control unit 22 drives each actuator (81*a* to 83*a* and the like) included in the first actuator group 80*a* based on the drive plan transmitted from the fusion MCU 10. The operation of the vehicle control unit 22 will be described later in detail.

<<<Control MCU 30>>>

As illustrated in FIG. 1, the control MCU 30 includes a failure detection unit (second failure detection unit) 31, a vehicle control unit 32, a mode selection unit 33, and a fallback calculation unit 34. The failure detection unit 31 detects the states of the fusion MCU 10 and the control MCU 20, and diagnoses the presence/absence of a failure. The failure detection unit 31 detects the state of the memory 40 and diagnoses the presence/absence of a failure. When detecting the failure of the fusion MCU 10, the control MCU 20, and the external environment sensor 61, the failure detection unit 31 transmits a failure detection signal to the mode selection unit 33. At this time, information specifying the failure part may be transmitted to the control MCU 30 together with the failure detection signal. In the present embodiment, the fusion MCU 10, the control MCU 20, and the control MCU 30 are each provided with a failure detection unit, and the plurality of failure detection units perform failure detection at each place.

The mode selection unit 33 is a functional block that switches the operation mode of the autonomous drive ECU 1. For example, when receiving a failure detection signal, the mode selection unit 33 switches the operation mode of the autonomous drive ECU 1 from the normal operation mode to the fallback operation mode. The mode selection unit 33 is connected to a plurality of external environment sensors included in the external environment sensor group 60. In the fallback operation mode, the mode selection unit 33 selects only some external environment sensors from the plurality of external environment sensors, acquires sensing data of the selected external environment sensors, and transmits them to the fallback calculation unit 34. In other words, the mode selection unit 33 acquires the sensing data while selecting the external environment sensors to be selected in time series.

The fallback calculation unit 34 is a functional block that performs calculation processing related to a fallback operation of moving the own vehicle from the current location to a safe escape place (safe position) in the fallback operation mode. The processing in the fallback operation mode will be described later in detail.

In the normal operation mode, the vehicle control unit 32 generates a drive signal that drives each actuator (81*b* to 83*b* and the like) included in the second actuator group 80*b* based on the drive plan transmitted from the fusion MCU 10, and transmits the generated drive signal to each actuator. On the other hand, in the fallback operation mode, the vehicle control unit 32 generates a drive signal that drives each actuator (81*b* to 83*b* and the like) based on the drive plan (second drive plan) transmitted from the fallback calculation unit 34, and transmits the generated drive signal to each actuator. The operation of the vehicle control unit 22 will be described later in detail.

<<<Memory 40>>>

The memory 40 is a functional block that stores various types of information such as a latest dynamic map constructed by the fusion MCU 10 and detection results by the failure detection units 11, 21, and 31. The memory 40 stores various types of information such as programs, tables, files, and setting information necessary for the operation of the autonomous drive ECU 1. Note that the memory 40 may store a dynamic map (second dynamic map, described below in detail) constructed by the fallback calculation unit 34.

The memory 40 includes a plurality of memories (a first memory 41 and a second memory 42) as illustrated in FIG.

1, and the first memory 41 and the second memory 42 each store identical information. Thus, the memory 40 is duplicated by the first memory 41 and the second memory 42. The first memory 41 corresponds to, for example, the fusion MCU 10 and the control MCU 20, and the second memory 42 corresponds to the control MCU 30. For example, the first memory 41 stores detection results by the failure detection units 11 and 21, and the second memory 42 stores detection results by the failure detection unit 31.

Various types of information such as programs, tables, and files may be stored in a recording device such as a hard disk and solid state drive (SSD), or in a recording medium such as an IC card, an SD card, and a DVD that are different from the memory 40.

<<Processing in Normal Operation Mode>>

Next, the processing in the normal operation mode will be described. First, a person on board the own vehicle manipulates a higher-level device such as a car navigation device to set a destination of the own vehicle. At this time, the person on board may set a transit place together with the destination. The setting for the destination and the transit place is transmitted to the fusion MCU 10 of the autonomous drive ECU 1.

Each external environment sensor 61 starts sensing around its own vehicle and transmits sensing data to the fusion MCU 10. The sensor fusion unit 12 extracts the surrounding situation (e.g., positions of obstacles such as other vehicles and pedestrians and landmarks) of the own vehicle based on the received sensing data. The sensor fusion unit 12 performs positioning of the landmark, the obstacle, and the own vehicle by collating the positions of the landmark and the obstacle with map information. The behavior prediction unit 13 predicts the behavior of an obstacle based on the surrounding situation of the own vehicle and constructs a dynamic map including risk information.

The track plan unit 14 generates a drive plan of the own vehicle based on the dynamic map and the set destination, and transmits the generated drive plan to the control MCUs 20 and 30. The track plan unit 14 stores the generated drive plan in the memory 40.

The vehicle control units 22 and 32 of the control MCUs 20 and 30 generate an autonomous drive profile (first autonomous drive profile) based on the drive plan transmitted from the fusion MCU 10. The autonomous drive profile generated here includes a track profile, a velocity profile, and a steering angle profile. The autonomous drive profile may include another profile.

The vehicle control units 22 and 32 generate a command value (first command value) for each actuator based on the generated autonomous drive profile, and transmit the generated command value to each corresponding actuator. Specifically speaking, the vehicle control unit 22 generates a command value for each actuator included in the first actuator group 80a, and transmits the generated command value to the actuators 81a to 83a of the first actuator group 80a, and the like. On the other hand, the vehicle control unit 32 generates a command value for each actuator included in the second actuator group 80b, and transmits the generated command value to the actuators 81b to 83b of the second actuator group 80b, and the like. Each actuator is driven based on the command value transmitted from the vehicle control units 22 and 32. By repeatedly performing these processing, the fusion MCU 10 performs autonomous drive of the own vehicle.

<<Processing in Fallback Operation Mode>>

Figure 2:
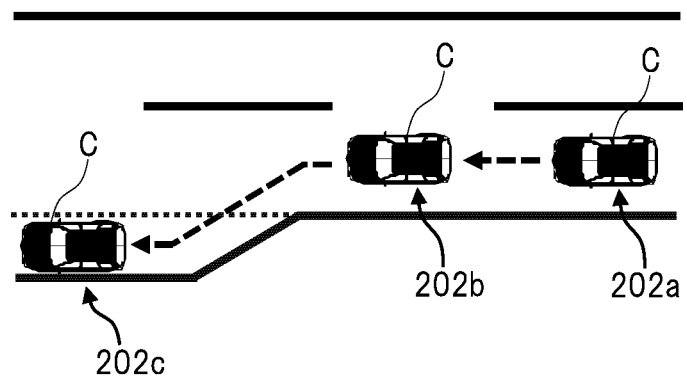
FIG. 2 is a view illustrating an example of a fallback operation of an own vehicle.

Next, the fallback operation mode will be described in detail. FIG. 2 is a view illustrating an example of the fallback operation of the own vehicle. FIG. 2 illustrates movement of an own vehicle C after an occurrence of a failure until the own vehicle C moves from the current location to the escape place. When a failure occurs at a current location 202a, the own vehicle C moves to a safe escape place 202c on the road shoulder via a position 202b and stops. In the fallback operation mode, only the actuators of the second actuator group 80b connected to the control MCU 30 are driven, and the own vehicle moves to a predetermined escape place by these actuators.

The mode selection unit 33 of the control MCU 30 switches the operation mode of the autonomous drive ECU 1 from the normal operation mode to the fallback operation mode, when the failure detection unit 11 of the fusion MCU 10 detects a failure of the external environment sensor 61 or the control MCU 20 not including the mode selection unit and the fallback calculation unit, when the failure detection unit 21 of the control MCU 20 detects a failure of the fusion MCU 10, when the failure detection unit 31 of the control MCU 30 detects a failure of the fusion MCU 10 or the control MCU 20 not including the mode selection unit and the fallback calculation unit, or when the failure detection unit 31 of the control MCU 30 detects a failure of the memory 40. For example, when receiving a failure detection signal from any of the fusion MCU 10 and the control MCUs 20 and 30, the mode selection unit 33 diagnoses that a failure has been detected, and switches the operation mode to the fallback operation mode.

The mode selection unit 33 may select the normal operation mode and the fallback operation mode by majority vote of the detection result by each of the failure detection units. For example, an explanation will be given with a case of performing failure detection for the fusion MCU 10 as an example. When the failure detection unit 21 detects a failure and the failure detection unit 21 detects no failure, the number of failure detection and failure non-detection becomes the same, and hence the mode selection unit 33 regards that the fusion MCU 10 has not failed and continuously sets the normal operation mode.

On the other hand, when both the failure detection units 21 and 31 detect a failure, the number of failure detection becomes larger than the number of failure non-detection, and hence the mode selection unit 33 regards that the fusion MCU 10 has failed and switches the operation mode to the fallback operation mode.

When the operation mode is switched to the fallback operation mode, the control MCU 30 notifies the fusion MCU 10 and the control MCU 20 of the fallback calculation, and notifies the fusion MCU 10 and the control MCU 20 that the operation mode has been switched to the fallback operation mode. By the fallback operation notification, the fusion MCU 10 stops generation and transmission of the drive plan, and the control MCUs 20 and 30 stop reception of the drive plan. The control MCU 30 generates a first control signal for giving an instruction to stop the fusion MCU 10 (another microcomputer) in which the failure has been detected, and transmits it to the fusion MCU 10.

The calculation processing related to autonomous drive is taken over from the fusion MCU 10 to the control MCU 30. The fallback calculation unit 34 accesses the memory 40 and reads the latest first dynamic map before the occurrence of the failure, i.e., immediately before the failure is diagnosed to have occurred. The fallback calculation unit 34 sets the escape place of the own vehicle near the current location based on the latest first dynamic map read from the memory 40. As mentioned earlier, the escape place is a safe place such as a road shoulder.

In parallel with the processing of the fallback calculation unit 34, the mode selection unit 33 selects some external environment sensors from the plurality of external environment sensors of the external environment sensor group 60. Specifically speaking, the mode selection unit 33 acquires the sensing data while switching the external environment sensor to be selected in time series. The fallback calculation unit 34 extracts a surrounding situation (second surrounding situation) of the own vehicle based on the sensing data of the external environment sensor selected by the mode selection unit 33.

Figure 3:
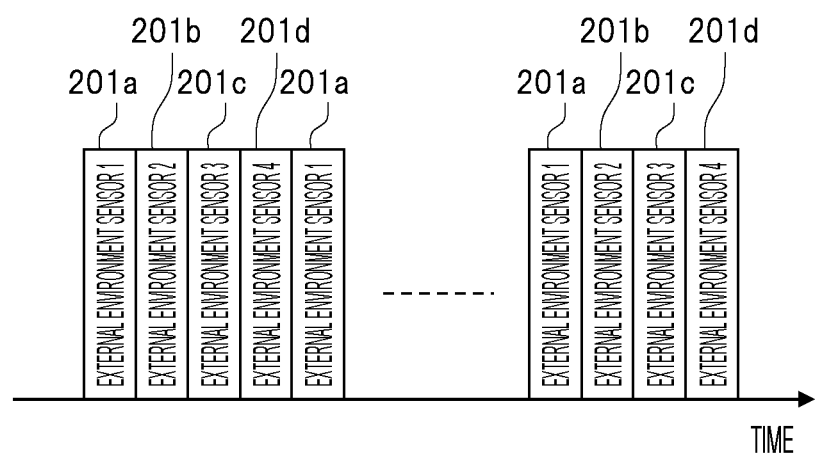
FIG. 3 is a view illustrating an example of a switch operation of an external environment sensor in a fallback operation mode.

FIG. 3 is a view illustrating an example of the switch operation of the external environment sensors 201a, 201b, 201c, 201d (e.g., 201) in the fallback operation mode. The horizontal axis of FIG. 3 is a time axis, and the external environment sensor 201 selected at each time is illustrated in time series. Referring to FIG. 2, at the time of an occurrence of a failure, the own vehicle C is traveling on the left lane. Therefore, the mode selection unit 33 sequentially selects external environment sensors 201a to 201d that sense, for example, a short distance in the front right, a long distance in the front, a short distance in the front left, and a short distance in the front. The mode selection unit 33 repeatedly selects these external environment sensors 201a to 201d. When the own vehicle C moves to an escape place P3, the fallback operation is completed, and the mode selection unit 33 stops the selection of the external environment sensor 201.

Note that the selection order of the external environment sensors 201a to 201d is merely an example and is not limited to this order. The external environment sensor 201 to be selected is not limited to these, and the external environment sensor 201 necessary for moving the vehicle to the escape place is selected in accordance with each condition such as the traveling position, the position of an obstacle around the own vehicle, and the escape place. The number of external environment sensors 201 to be selected is not limited to four as illustrated in FIG. 3. The mode selection unit 33 may simultaneously select a plurality of external environment sensors 201 in accordance with the processing capacity of the control MCU 30.

The fallback calculation unit 34 constructs a dynamic map (second dynamic map) based on the latest first dynamic map and the second surrounding situation. This dynamic map takes over the risk information included in the first dynamic map. The fallback calculation unit 34 creates a drive plan (second drive plan) for fallback operation based on the second dynamic map and the escape place, and transmits the created drive plan to the vehicle control unit 32.

Based on the drive plan transmitted from the fallback calculation unit 34, the vehicle control unit 32 generates an autonomous drive profile (second autonomous drive profile) for fallback operation. The autonomous drive profile generated here includes profiles such as a track profile, a velocity profile, and a steering angle profile. Based on the generated autonomous drive profile, the vehicle control unit 32 generates a command value (second command value) for the actuator included in the second actuator group 80b, and transmits the generated command value to the actuators 81b to 83b and the like. By repeatedly performing these processing, the control MCU 30 performs autonomous drive of the own vehicle at the time of the fallback operation mode.

On the other hand, in the fallback operation mode, no control is performed for the actuators 81a to 81c of the first actuator group 80a. Therefore, in the fallback operation mode, only one of the pair of actuators operates, and hence the output of the actuator is halved as compared with the normal operation mode.

The fallback operation mode described here is applied to any case where the fusion MCU 10, the control MCU 20, or the external environment sensor 61 fails. However, when the external environment sensor fails, the mode selection unit 33 excludes the failed external environment sensor from the selection target, and selects only an external environment sensor that has not failed.

<<Restoration Processing of Failed Device>>

Next, the restoration processing of the failed device (the fusion MCU 10, the control MCUs 20 and 30, and the like) will be described. When a failure is detected, the operation is stopped by a control signal. The device whose operation is stopped is restarted the failure part excluded based on the detection result of the failure. For example, when a part that implements a specific function of the fusion MCU fails, the fusion MCU 10 is restarted with that part excluded. At the time of restart, for example, the control MCU 30 generates a control signal for giving an instruction to start, and transmits the generated control signal to the fusion MCU 10. The restart of the failed device may be performed during autonomous drive or after the own vehicle is stopped at the escape place, depending on the importance of the failure part.

<Main Effect of Present Embodiment>

According to the present embodiment, when the operation mode is switched to the fallback operation mode, the calculation processing related to the autonomous drive is taken over from the fusion MCU 10 to the control MCU 30. The control MCU 30 moves the own vehicle C from the current location 202a to the escape place 202c by the fallback operation. According to this configuration, even if a failure occurs in the autonomous drive ECU 1, the own vehicle can be moved to a safe escape place and stopped. According to this configuration, the control MCUs 20 and 30 can be equipped with a CPU having a processing capacity lower than that of the fusion MCU 10. This makes it possible to achieve a low-cost, highly-reliable advanced autonomous drive system.

According to the present embodiment, in the fallback operation mode, the mode selection unit 33 acquires the sensing data while switching the external environment sensor to be selected in time series. Thus, by switching the external environment sensor to be selected in a time division manner, it is possible to exhaustively perform sensing around the own vehicle at the time of occurrence of a failure even if the processing capacity of the control MCU 30 is low, and it is possible to move the vehicle to the escape place more safely.

According to the present embodiment, the mode selection unit 33 selects the normal operation mode and the fallback operation mode by majority vote of the detection result by each of the failure detection units. According to this configuration, it is possible to freely set the switching method of the operation mode in accordance with the importance of the failure part in the autonomous drive.

According to the present embodiment, in the fallback operation mode, the mode selection unit 33 selects an appropriate external environment sensor in accordance with the surrounding situation of the own vehicle such as the traveling position and the position of an obstacle. According to this configuration, it is possible to effectively sense the surrounding of the own vehicle at the time of the fallback operation, and it is possible to move the own vehicle to the escape place more safely.

According to the present embodiment, the memory 40 stores the latest first dynamic map immediately before the occurrence of the failure and the detection result of the failure. According to this configuration, even if access to the fusion MCU 10 becomes impossible due to the occurrence of a failure, the fallback calculation unit 34 can acquire the latest first dynamic map before the occurrence of the failure. This causes the calculation processing related to the fallback operation to be surely executed, and it becomes possible to continue performing the autonomous drive.

According to the present embodiment, the memory 40 is duplicated by the first memory 41 and the second memory 42 that store the same information. According to this configuration, the fallback calculation unit 34 can surely acquire the latest first dynamic map even if a failure occurs in any memory.

According to the present embodiment, when switched to the fallback operation mode, the control MCU 30 notifies both the fusion MCU 10 and the control MCU 20 of the fallback operation. According to this configuration, even when the fusion MCU 10 cannot stop generation and transmission of the drive plan or when the control MCU 20 cannot stop reception of the drive plan, it is possible to surely stop the operation of each actuator of the first actuator group 80a. This makes it possible to stabilize the behavior of the own vehicle at the time of the fallback operation mode.

According to the present embodiment, the fusion MCU 10 and the control MCU 30 generate and transmit a control signal for giving an instruction to start/stop another microcomputer in which a failure has been detected. The microcomputer in which the failure has been detected is restarted with the failure part excluded based on the detection result. According to this configuration, the part where the failure has occurred can be separated from the autonomous drive control, and it becomes possible to safely perform the fallback operation after the occurrence of the failure. It becomes possible to use the device including the failure part within a range not interfering with the autonomous drive.

Second Embodiment

Figure 4:
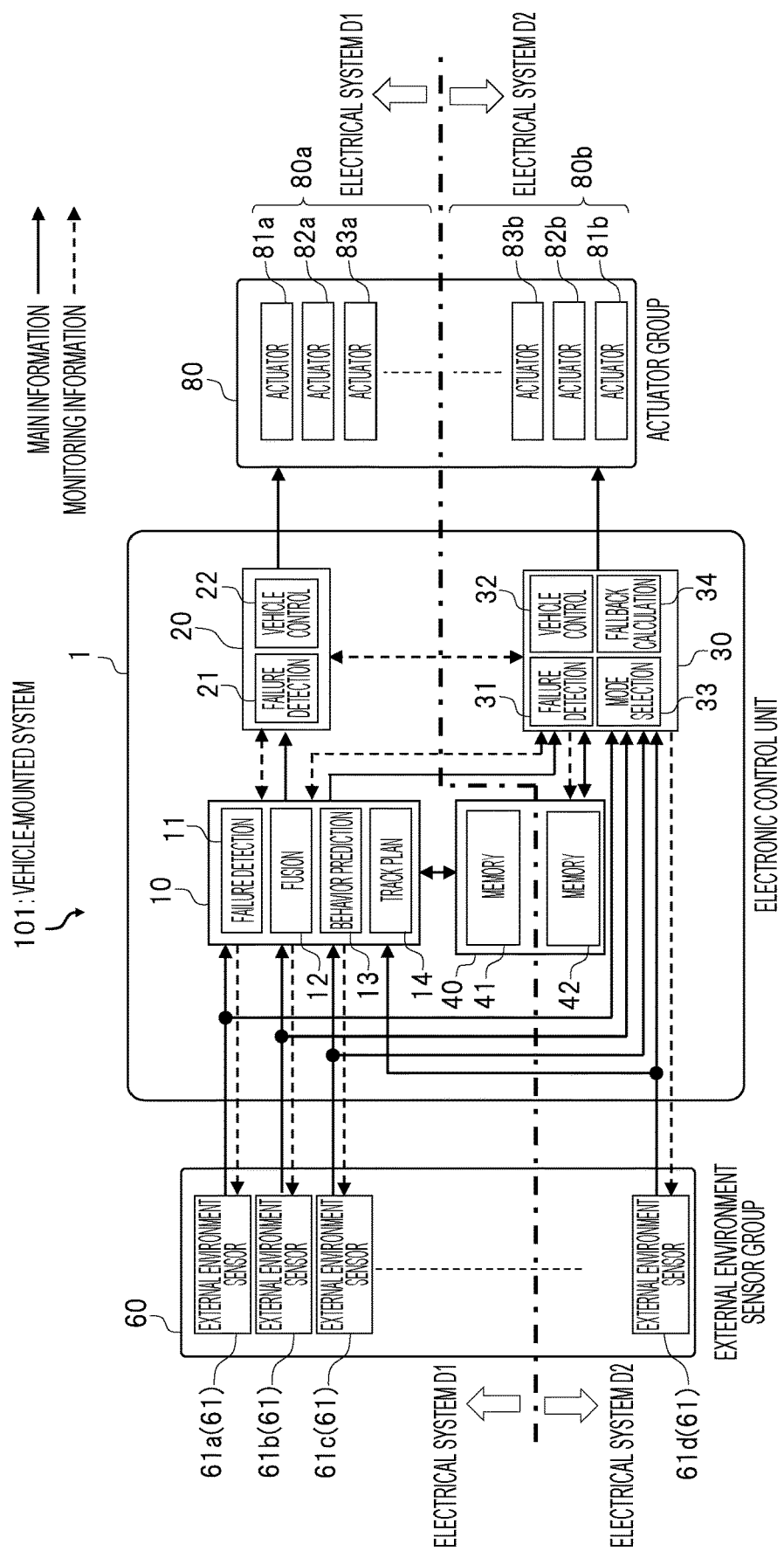
FIG. 4 is a view illustrating an example of a power supply system of a vehicle-mounted system according to a second embodiment of the present invention.

Next, the second embodiment will be described. In the present embodiment, an autonomous drive ECU and a vehicle-mounted system that include a plurality of power supply systems will be described. FIG. 4 is a view illustrating an example of the power supply system of the vehicle-mounted system according to the second embodiment of the present invention. The vehicle-mounted system 101 illustrated in FIG. 4 is connected to two power supply systems D1 and D2. The power supply systems D1 and D2 are each connected to an independent battery (not illustrated) different from each other.

The power supply system D1 supplies power to some external environment sensors (e.g., 61a to 61c and the like) of the external environment sensor group 60, the fusion MCU 10, the control MCU 20, the first memory 41 of the memory 40, and the actuators (e.g., 81a to 83a) of the first actuator group 80a. On the other hand, the power supply system D2 supplies power to some external environment sensors (e.g., 61d and the like) of the external environment sensor group 60, the control MCU 30, the second memory 42 of the memory 40, and the actuators (e.g., 81a to 83a) of the first actuator group 80a.

The failure detection units 11 and 21 detect failures of the power supply of the power supply system D2, the communicator, and the second memory 42 that are connected to the control MCU 30. The detection results of these failures are stored in the first memory 41. Then, the fusion MCU 10 generates and transmits a control signal for giving an instruction to stop power supply, a communicator, or a memory that are connected to another microcomputer (control MCU 30) in which a failure has been detected. The device receiving the control signal stops its operation.

On the other hand, the failure detection unit 31 detects the failure of the power supply of the power supply system D1, the communicator, and the first memory 41 that are connected to the fusion MCU 10 and the control MCU 20. The detection results of these failures are stored in the second memory 42. Then, the control MCU 30 generates and transmits a control signal for giving an instruction to stop power supply, a communicator, or a memory that are connected to another microcomputer (fusion MCU 10 and control MCU 20) in which a failure has been detected. The device receiving the control signal stops its operation.

As described in the first embodiment, the device whose operation is stopped is restarted the failure part excluded based on the detection result of the failure. The restart of the failed device may be performed during autonomous drive or after the own vehicle is stopped at the escape place, depending on the importance of the failure part.

The fusion MCU 10 and the control MCU 30 having the fallback calculation unit 34 are connected to different power supplies from each other. This allows the operation of the autonomous drive ECU 1 to be continued even if a failure occurs in one battery.

It is possible to perform the failure detection of the power supply by detecting the operation state of each microcomputer or by monitoring the electrical state (e.g., output current, output voltage, and internal resistance) of the power supply itself. Since the first memory 41 and the second memory 42 are also connected to different power supplies from each other, it is possible to surely store the first dynamic map even if a failure occurs in one battery. Even when a failure occurs, the autonomous drive can be continued safely and at low cost.

The vehicle-mounted system 101 may be connected to three or more power supply systems. For example, the fusion MCU 10 and the control MCUs 20 and 30 may be connected to different power supply systems from one another.

Furthermore, the fusion MCU 10, the control MCUs 20 and 30, the first memory 41, and the second memory 42 may be connected to different power supply systems from one another. This further improves the safety at the time of occurrence of a failure.

Third Embodiment

Next, the third embodiment will be described. In the present embodiment, an autonomous drive ECU and a vehicle-mounted system provided with a plurality of control MCUs including a mode selection unit and a fallback calculation unit will be described.

Figure 5:
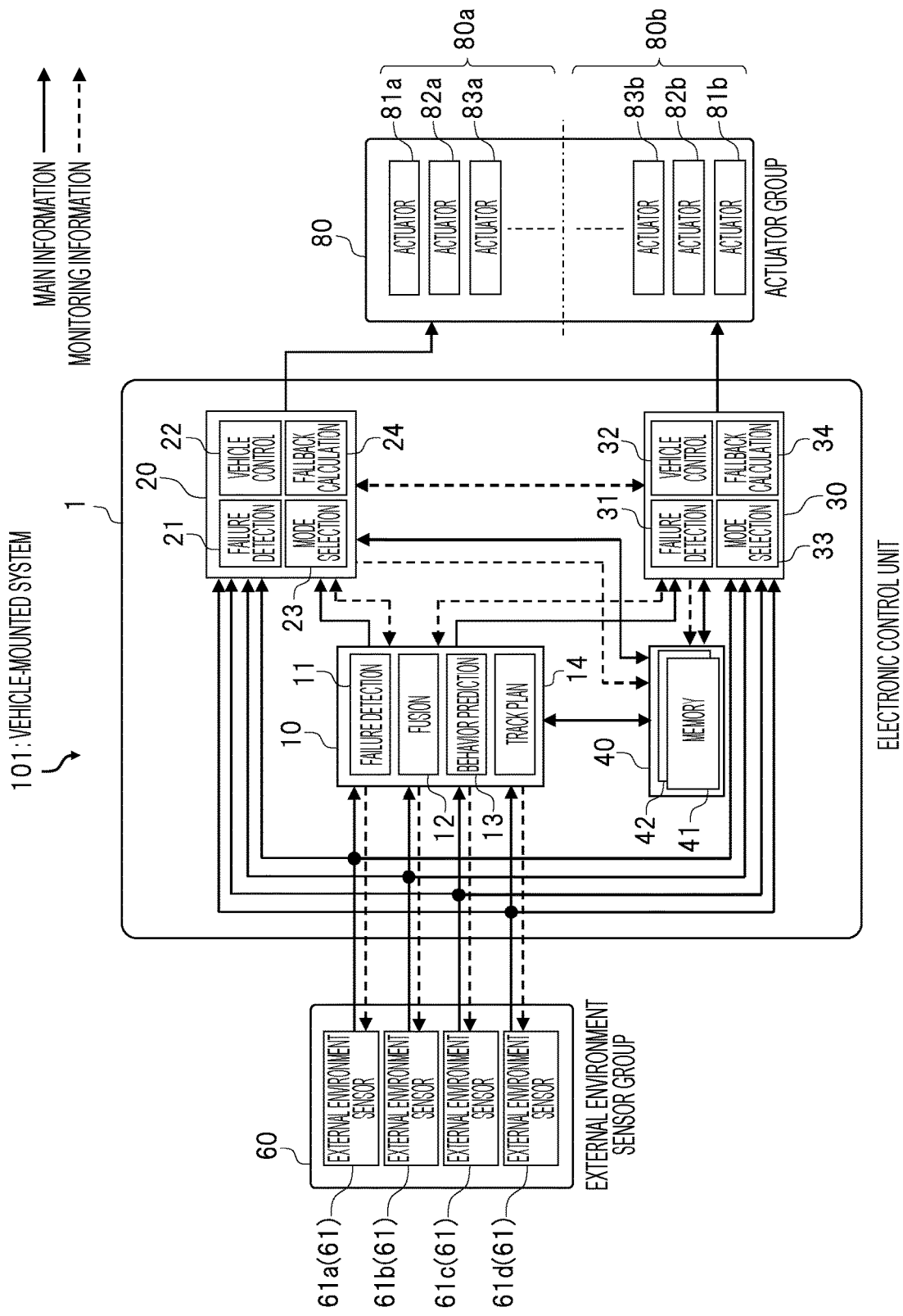
FIG. 5 is a block diagram illustrating an example of a configuration of a vehicle-mounted system according to a third embodiment of the present invention.

FIG. 5 is a block diagram illustrating an example of the configuration of the vehicle-mounted system according to the third embodiment of the present invention. The control MCU 20 illustrated in FIG. 5 includes a mode selection unit 23 and a fallback calculation unit 24 in addition to the failure detection unit 21 and the vehicle control unit 22. The control MCU 20 is connected to each external environment sensor 61 of the external environment sensor group. The mode selection unit 23 and the fallback calculation unit 24 have the same configuration as those of the mode selection unit 33 and the fallback calculation unit 34 of the control MCU 30, respectively. The operations of the mode selection unit 23 and the fallback calculation unit 24 are the same as those of the mode selection unit 33 and the fallback calculation unit 34, respectively.

In the third embodiment, the failure detection unit 11 of the fusion MCU 10 and the failure detection unit 21 of the control MCU 20 also perform failure detection of the control MCU 30. When a failure of the control MCU 30 is detected, the fallback operation by the control MCU 20 is executed. In this case, the actuators (81a to 83a and the like) included in the first actuator group 80a are driven, and the own vehicle moves to the escape place.

On the other hand, when a failure occurs in a component other than the control MCUs 20 and 30, the control MCUs 20 and 30 each execute the fallback operation. In this case, since all the actuators are driven, the fallback operation is performed without halving the output. This can further ensure to move the own vehicle to a safe escape place.

Also in the present embodiment, as in the second embodiment described earlier, the vehicle-mounted system 101 may be connected to a plurality of power supply systems. In this case, the control MCUs 20 and 30 are preferably connected to different power supply systems from each other. According to this, power is supplied to either of the control MCUs 20 and 30 even if a failure occurs in the battery, and hence the fallback operation is surely executed.

Fourth Embodiment

Next, the fourth embodiment will be described. In the present embodiment, an autonomous drive ECU and a vehicle-mounted system that include a vehicle motion controller will be described.

Figure 6:
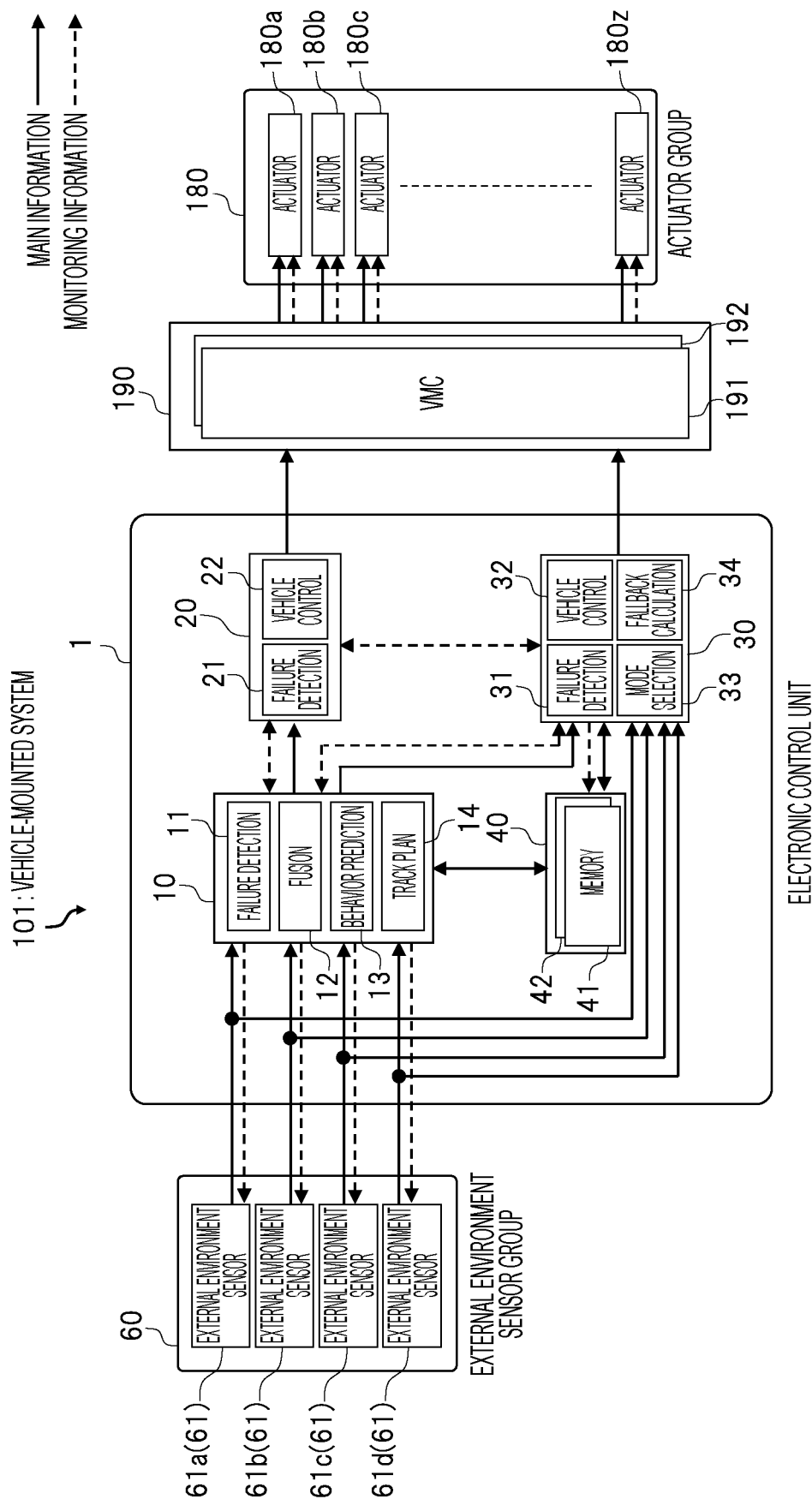
FIG. 6 is a block diagram illustrating an example of a configuration of a vehicle-mounted system according to a fourth embodiment of the present invention.

FIG. 6 is a block diagram illustrating an example of the configuration of the vehicle-mounted system according to the fourth embodiment of the present invention. The vehicle-mounted system 101 illustrated in FIG. 4 includes an actuator group 180 and a vehicle motion controller (VMC) 190.

The actuator group 180 has a plurality of actuators (e.g., 180a to 180z and the like). Each of the actuators 180a to 180z is connected to the vehicle motion controller 190.

The vehicle motion controller 190 is a functional block that integrally controls the actuators (180a to 180z) based on the autonomous drive profile transmitted from the control MCUs 20 and 30.

The vehicle motion controller 190 has a first vehicle motion controller 191 and a second vehicle motion controller 192. The first vehicle motion controller 191 and the second vehicle motion controller 192 have similar functions. In other words, the vehicle motion controller 190 is duplicated by the first vehicle motion controller 191 and the second vehicle motion controller 192. The vehicle motion controller 190 may include three or more units. That is, the vehicle motion controller 190 may include a third vehicle motion controller and the like.

When the vehicle-mounted system 101 is connected to a plurality of power supply systems, the first vehicle motion controller 191 and the second vehicle motion controller 192 are preferably connected to different power supply systems from each other.

In the vehicle motion controller 190, the first vehicle motion controller 191 is usually used, and when a failure occurs in the first vehicle motion controller 191, the second vehicle motion controller 192 is used. However, when the second vehicle motion controller 192 is used and a failure occurs in the second vehicle motion controller 192, the first vehicle motion controller 191 may be used.

The failure detection unit 31 of the control MCU 30 performs failure detection of the vehicle motion controller 190 and the actuators 180a to 180z of the actuator group 180.

Next, the operation of the vehicle-mounted system 101 of the present embodiment will be described. When the operation mode is the normal operation mode, the vehicle control units 22 and 32 of the control MCUs 20 and 30 generate an autonomous drive profile (first autonomous drive profile) based on the drive plan transmitted from the fusion MCU 10, and transmit the generated autonomous drive profile to the vehicle motion controller 190. The vehicle motion controller 190 generates a command value (third command value) for each of the actuators 180a to 180z in consideration of cooperation with each actuator based on the transmitted autonomous drive profile. The vehicle motion controller 190 transmits the generated command value to the corresponding actuators 180a to 180z.

On the other hand, when failures of the vehicle motion controller 190, the actuators 180a to 180z, and the like are detected, the operation mode is switched to the fallback operation mode. At the time of the fallback operation mode, the vehicle control unit 32 of the control MCU 30 generates an autonomous drive profile (second autonomous drive profile) based on a drive plan (second drive plan) generated in the fallback calculation unit 34, and transmits the generated autonomous drive profile to the vehicle motion controller 190. The vehicle motion controller 190 generates a command value (fourth command value) for fallback operation for each of the actuators 180a to 180z in consideration of cooperation with each actuator based on the transmitted autonomous drive profile. The vehicle motion controller 190 transmits the generated command value to the corresponding actuators 180a to 180z.

Thus, in the present embodiment, the control MCUs 20 and 30 perform the processing up to generation of the autonomous drive profile, and the command value to each actuator is generated by the vehicle motion controller 190.

According to the present embodiment, since the plurality of actuators are integrally controlled, seamless and comfortable autonomous drive travel can be achieved in every scene from autonomous parking requiring a low speed large steering angle to high-speed travel such as lane keeping.

When a failure occurs in the actuator, the mode selection unit 33 selects an actuator minimally necessary for moving the own vehicle to a safe escape place from among actuators 180a to 180z that have not failed, and transmits information on the selected actuator to the vehicle motion controller 190. The vehicle motion controller 190 generates each command value corresponding to the selected actuator based on the autonomous drive profile. The vehicle motion controller 190 may be provided with a failure detection unit. In this case, the vehicle motion controller 190 may share failure detection information with the control MCU 30.

According to the present embodiment, even if a failure occurs in the actuator, it becomes possible to move the own vehicle more smoothly to a safe escape place by the integrated control for the remaining actuators by the vehicle motion controller 190.

Also in the present embodiment, the control MCU 20 may be provided with the mode selection unit 23 and the fallback calculation unit 24 as in the third embodiment. This duplicates the control MCU that performs the calculation related to the fallback operation. In this case, the control MCUs 20 and 30 are preferably connected to different power supplies from each other.

It should be noted that the present invention is not limited to the above-described embodiments, but includes various modifications. It is possible to replace a part of the configuration of one embodiment with the configuration of another embodiment, or is also possible to add the configuration of another embodiment to the configuration of one embodiment. It is possible to add, delete, or replace a part of the configuration to, from or with a part of each embodiment. Note that each member and relative size described in the drawings are simplified and idealized for easy-to-understand explanation of the present invention, and are sometimes have a more complicated shape in implementation.

Each unit constituting the autonomous drive ECU may be configured by hardware such as an integrated circuit. The autonomous drive ECU may include a CPU, a RAM, and the like, and the CPU executes a program developed in the RAM, whereby the fusion MCU 10, the control MCUs 20 and 30, the vehicle motion controller 190, and the like may be achieved.

Control lines and information lines illustrated in each drawing are mainly considered to be necessary for explanation, and not all the control lines and information lines are illustrated. In practice, almost all components may be considered to be interconnected.

Preferred embodiments will be additionally described below.

In the vehicle-mounted system, the failure detection unit detects a failure of a power supply, a communicator, or the memory that are connected to the microcomputer, and the memory stores a detection result of the power supply, the communicator, or the memory.

In the vehicle-mounted system, the microcomputer generates and transmits a first control signal that gives an instruction to start/stop another microcomputer in which a failure has been detected.

In the vehicle-mounted system, the microcomputer generates and transmits a second control signal that gives an instruction to start/stop the power supply, the communicator, or the memory connected to another microcomputer in which a failure has been detected.

In the vehicle-mounted system, the microcomputer in which a failure has been detected restarts with a failure part excluded based on the detection result.

In the vehicle-mounted system, the electronic control unit includes a plurality of the memories, and each of the memories stores the detection result of the corresponding microcomputer, and a power supply of each of the memories is common to the microcomputer to be stored.

REFERENCE SIGNS LIST

1 autonomous drive ECU (electronic control unit)
10 fusion MCU (microcomputer)
20, 30 control MCU
11, 21, 31 failure detection unit
22, 32 vehicle control unit
33 mode selection unit
34 fallback calculation unit
40 memory
41 first memory
42 second memory
60 external environment sensor group
61 external environment sensor (sensor)
80, 180 actuator group
81*a* to 83*a*, 81*b* to 83*b*, 180*a* to 180*z* actuator
101 vehicle-mounted system
190 vehicle motion controller
191 first vehicle motion controller
192 second vehicle motion controller

The invention claimed is:

1. An electronic control unit, comprising:
at least three microcomputers capable of receiving sensing data from a plurality of sensors, the at least three microcomputers comprising a first microcomputer, a second microcomputer, and a third microcomputer;
at least three failure detectors configured to detect a failure of at least one or more sensors of the plurality of sensors and a failure of one or more microcomputers of the at least three microcomputers, the at least three failure detectors comprising a first failure detector associated with the first microcomputer, a second failure detector associated with the second microcomputer, and a third failure detector associated with the third microcomputer;
a mode selector configured to select a normal operation mode or a fallback operation mode in accordance with a detection result by the at least three failure detectors, the mode selector configured to select the fallback operation mode when Ii) the first failure detector detects the failure of the at least one or more sensors of the plurality of sensors, (ii) the second failure detector detects the failure of the first microcomputer, and (iii) the third failure detector detects the failure of the first microcomputer; and
a sensor selector configured to select a sensor of the plurality of sensors based on the failure detected by the at least three failure detectors or a surrounding situation of an own vehicle calculated from the sensing data,
wherein any of the second microcomputer or the third microcomputer generates, in the fallback operation mode, a drive signal for operating an actuator using the sensing data received from the sensor selected by the sensor selector, and transmits the drive signal to the actuator.

2. The electronic control unit according to claim 1,
wherein, in the fallback operation mode, at least one of the second microcomputer or the third microcomputer receives the sensing data in an ordered time series in which the at least one of the second microcomputer or the third microcomputer receives the sensing data from (i) a first sensor of the plurality of sensors for a first time period and (ii) a second sensor of the plurality of sensors for a second time period, the second time period following the first time period.

3. The electronic control unit according to claim 2,
wherein in a case of the fallback operation mode,
while the sensor selector selects, in the ordered time series, the sensor to be selected, and
any of the second microcomputer or the third microcomputer generates the drive signal and stops the own vehicle at a safe position.

4. The electronic control unit according to claim 1, comprising:
a memory that stores the detection result.

5. The electronic control unit according to claim 4,
wherein the at least three failure detectors detects a failure of a power supply, a communicator, or the memory that are connected to the first microcomputer, and
the memory stores a detection result of the power supply, the communicator, or the memory.

6. The electronic control unit according to claim 5,
wherein, in response to detecting a failure among the at least three microcomputers, the second microcomputer generates and transmits a control signal that gives an instruction to start/stop the power supply, the communicator, or the memory connected to the first microcomputer.

7. The electronic control unit according to claim 5, comprising:
a plurality of the memories,
wherein each of the memories stores the detection result of the corresponding microcomputer, and
a power supply of each of the memories is common to the microcomputer to be stored.

8. The electronic control unit according to claim 1,
wherein, in response to detecting a failure among the at least three microcomputers, the second microcomputer generates and transmits a control signal that gives an instruction to start/stop the first microcomputer.

9. The electronic control unit according to claim 8,
wherein the first microcomputer in which the failure has been detected restarts with a failure part of the first microcomputer excluded based on the detection result, the failure part corresponding to the failure detected in association with the first microcomputer.

10. The electronic control unit according to claim 1, wherein the actuator is a first actuator associated with the third microcomputer, and wherein any of the second microcomputer or the third microcomputer generates, in the fallback operation mode, a stop signal for stopping operation of a second actuator associated with the second microcomputer, and transmits the stop signal to the second actuator.

11. A vehicle-mounted system, comprising:
a plurality of sensors;
a plurality of actuators; and
an electronic control unit,
wherein the electronic control unit includes:
at least three microcomputers capable of receiving sensing data from the plurality of sensors, the at least three microcomputers comprising a first microcomputer, a second microcomputer, and a third microcomputer,
at least three failure detectors configured to detect a failure of at least one or more sensors of the plurality of sensors or one and a failure of more microcomputers of the at least three microcomputers, the at least three failure detectors comprising a first failure detector associated with the first microcomputer, a second failure detector associated with the second microcomputer, and a third failure detector associated with the third microcomputer, a mode selector configured to select a normal operation mode or a fallback operation mode in accordance with a detection result by the at least three failure detectors, the mode selector configured to select the fallback operation mode when Ii) the first failure detector detects the failure of the at least one or more sensors of the plurality of sensors, (ii) the second failure detector detects the failure of the first microcomputer, and (iii) the third failure detector detects the failure of the first microcomputer, and a sensor selector configured to select a sensor of the plurality of sensors based on the failure detected by the at least three failure detectors or a surrounding situation of an own vehicle calculated from the sensing data, and any of the second microcomputer or the third microcomputer generates, in the fallback operation mode, a drive signal for operating an actuator using the sensing data received from the sensor selected by the sensor selector, and transmits the drive signal to the actuator.

12. The vehicle-mounted system according to claim 11,
wherein, in the fallback operation mode, at least one of the second microcomputer or the third microcomputer receives the sensing data in an ordered time series in which the at least one of the second microcomputer or the third microcomputer receives the sensing data from (i) a first sensor of the plurality of sensors for a first time period and (ii) a second sensor of the plurality of sensors for a second time period, the second time period following the first time period.

13. The vehicle-mounted system according to claim 12,
wherein in a case of the fallback operation mode,
while the sensor selector selects, in the ordered time series, the sensor to be selected, and
any of the second microcomputer or the third microcomputer generates the drive signal and stops the own vehicle at a safe position.

14. The vehicle-mounted system according to claim 11, comprising:
a memory that stores the detection result.

15. The vehicle-mounted system according to claim 11, wherein the actuator is a first actuator associated with the third microcomputer, and wherein any of the second microcomputer or the third microcomputer generates, in the fallback operation mode, a stop signal for stopping operation of a second actuator associated with the second microcomputer, and transmits the stop signal to the second actuator.

* * * * *